US010731393B2

(12) United States Patent
Ihrke et al.

(10) Patent No.: US 10,731,393 B2
(45) Date of Patent: Aug. 4, 2020

(54) DUAL PLATFORM BUMPER SYSTEM FOR VEHICLE DOORS

(71) Applicants: Randy K Ihrke, Auburn Hills, MI (US); Christopher J Sytek, Clarkston, MI (US); Christopher J Duke, White Lake, MI (US)

(72) Inventors: Randy K Ihrke, Auburn Hills, MI (US); Christopher J Sytek, Clarkston, MI (US); Christopher J Duke, White Lake, MI (US)

(73) Assignee: FCA US LLC, Auburn Hills, MI (US)

( * ) Notice: Subject to any disclaimer, the term of this patent is extended or adjusted under 35 U.S.C. 154(b) by 222 days.

(21) Appl. No.: 15/940,222

(22) Filed: Mar. 29, 2018

(65) Prior Publication Data
US 2019/0301223 A1 Oct. 3, 2019

(51) Int. Cl.
*B62D 33/02* (2006.01)
*E05F 5/06* (2006.01)
*B62D 33/027* (2006.01)
*E05F 5/02* (2006.01)
*B60J 5/10* (2006.01)

(52) U.S. Cl.
CPC .............. *E05F 5/06* (2013.01); *B60J 5/108* (2013.01); *B62D 33/0273* (2013.01); *E05F 5/022* (2013.01); *E05Y 2900/546* (2013.01)

(58) Field of Classification Search
CPC .............. E05F 5/06; E05F 5/022; B60J 5/108
USPC .................. 296/146.9, 57.1, 50, 51
See application file for complete search history.

(56) References Cited

U.S. PATENT DOCUMENTS

| | | | |
|---|---|---|---|
| 3,567,274 A | 3/1971 | Kaptur et al. | |
| 6,039,389 A * | 3/2000 | Monette | B60J 5/101 296/207 |
| 6,305,737 B1 | 10/2001 | Corder et al. | |
| 6,349,989 B1 * | 2/2002 | Kim | B60J 5/101 296/146.9 |
| 6,938,941 B2 | 9/2005 | Thiele et al. | |
| 8,136,862 B2 | 3/2012 | Bator et al. | |
| 8,246,098 B2 | 8/2012 | Cheung et al. | |
| 8,628,141 B1 | 1/2014 | Thorpe et al. | |
| 8,740,279 B1 | 6/2014 | McGoff et al. | |
| 2012/0126564 A1 | 5/2012 | Hausler et al. | |
| 2014/0091600 A1 | 4/2014 | Lusky et al. | |

FOREIGN PATENT DOCUMENTS

EP 0604215 B1 12/1997

* cited by examiner

*Primary Examiner* — Joseph D. Pape
(74) *Attorney, Agent, or Firm* — Ralph E Smith

(57) ABSTRACT

A dual platform bumper system for a vehicle includes a bumper configured to couple to one of the door or another vehicle component, the bumper having first and second points of contact, and a platform configured to couple to the other of the door and the other vehicle component. The platform includes an upper contact platform and a lower contact platform. The upper contact platform is configured to contact the first point of contact when the door is moved to a closed position, and the lower contact platform is configured to contact the second point of contact when the door is moved to the closed position to facilitate preventing over-travel relative movement of the at least one door.

16 Claims, 6 Drawing Sheets

DUAL PLATFORM BUMPER SYSTEM FOR VEHICLE DOORS

FIELD

The present application relates generally to a multifunctional vehicle tailgate and, more particularly, to a dual platform bumper system for a multifunctional vehicle tailgate.

BACKGROUND

Vehicles typically include a closure member to provide selective access to an area or compartment, such as a cargo bed or trunk. The closure member, such as a door or gate, is typically affixed to the vehicle and utilized both to block and provide access to the vehicle compartment without having to completely separate the closure member from the vehicle. In some instances, one portion of the closure member is movable independent of another portion of the closure member. However, unsupported portions of such independent closure members may be subject to over motion and fore-aft oscillation. Accordingly, while such systems work well for their intended purpose, it is desirable to provide improved vehicle door systems.

SUMMARY

In accordance with one example aspect of the disclosure, a dual platform bumper system for a vehicle having at least one door is provided. The system includes, in one exemplary implementation, a bumper configured to couple to one of the door or another vehicle component, the bumper having first and second points of contact, and a platform configured to couple to the other of the door and the other vehicle component. The platform includes an upper contact platform and a lower contact platform. The upper contact platform is configured to contact the first point of contact when the door is moved to a closed position, and the lower contact platform is configured to contact the second point of contact when the door is moved to the closed position to facilitate preventing over-travel relative movement of the at least one door.

In addition to the foregoing, the described bumper system may include one or more of the following: wherein the upper contact platform extends along a first plane, and the lower contact platform extends along a second plane that is different than the first plane; wherein the first plane is oriented at a non-parallel angle relative to a horizontal plane, the upper contact platform being ramped to increase contact with the bumper the further the door moves toward the closed position; and wherein the second plane is oriented at a non-parallel angle relative to the horizontal plane, the lower contact platform being ramped to increase contact with the bumper the further door moves toward the closed position.

In addition to the foregoing, the described bumper system may include one or more of the following: wherein the bumper includes an inner surface and an opposite outer surface, the inner surface configured to couple to the one of the door or other vehicle component; wherein the outer surface includes a valley disposed between an upper peak and a lower peak, wherein the lower peak includes a curved outer surface having an apex that is the first point of contact, and wherein the upper peak includes a curved outer surface having an apex that is the second point of contact; wherein the upper peak further includes a relief aperture that defines a deflectable rib configured to selectively elastically deform into the relief aperture when contacted by the lower contact platform; wherein the lower peak further includes a relief aperture that defines a deflectable rib configured to selectively elastically deform into the relief aperture when contacted by the upper contact platform; and wherein the bumper is configured to couple to a first tailgate door of a split door tailgate system, and the platform is configured to couple to a second tailgate door of the split door tailgate system.

In accordance with another example aspect of the disclosure, a vehicle is provided. The vehicle includes, in one exemplary implementation a frame and a split door tailgate system having a first tailgate door and a second tailgate door. The first tailgate door is pivotably coupled to the frame about a first vertical axis, and the second tailgate door is pivotably coupled to the frame about a second vertical axis. A dual platform bumper system includes a bumper coupled to the first tailgate door and having first and second points of contact, and a platform coupled to the second tailgate door and configured to engage the bumper when the first and second tailgate doors are in the closed position. The platform includes an upper contact platform configured to contact the first point of contact when the first tailgate door is closed and the second tailgate door is moved to a closed position, and a lower contact platform configured to contact the second point of contact when the first tailgate door is closed and the second tailgate door is moved to the closed position.

In addition to the foregoing, the described vehicle may include one or more of the following: wherein the upper contact platform extends along a first plane, and the lower contact platform extends along a second plane that is different than the first plane; wherein the first plane is oriented at a non-parallel angle relative to a horizontal plane, the upper contact platform being ramped to increase contact with the bumper the further the second tailgate door moves toward the closed position; and wherein the second plane is oriented at a non-parallel angle relative to the horizontal plane, the lower contact platform being ramped to increase contact with the bumper the further second tailgate door moves toward the closed position.

In addition to the foregoing, the described vehicle may include one or more of the following: wherein the bumper includes an inner surface and an opposite outer surface, the inner surface coupled to the first tailgate door; wherein the outer surface includes a valley disposed between an upper peak and a lower peak, wherein the lower peak includes a curved outer surface having an apex that is the first point of contact, and wherein the upper peak includes a curved outer surface having an apex that is the second point of contact; wherein the upper peak further includes a relief aperture that defines a deflectable rib configured to selectively elastically deform when contacted by the lower contact platform; and wherein the lower peak further includes a relief aperture that defines a deflectable rib configured to selectively elastically deform when contacted by the upper contact platform.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

The present application is directed to systems and methods for a bumper system for a split door vehicle system, such as a split door tailgate system. The bumper system provides, in one exemplary implementation, a dual plane platform configured to engage two separate surfaces of a corresponding deflectable bumper. The system thus provides two separate contact points to limit door-to-door over-travel and control sliding friction. During tailgate closing, the dual planes enable a pass-by feature to initially avoid undesirable contact, and then provide control of the point of engagement between the split tailgate doors.

Figure 1:
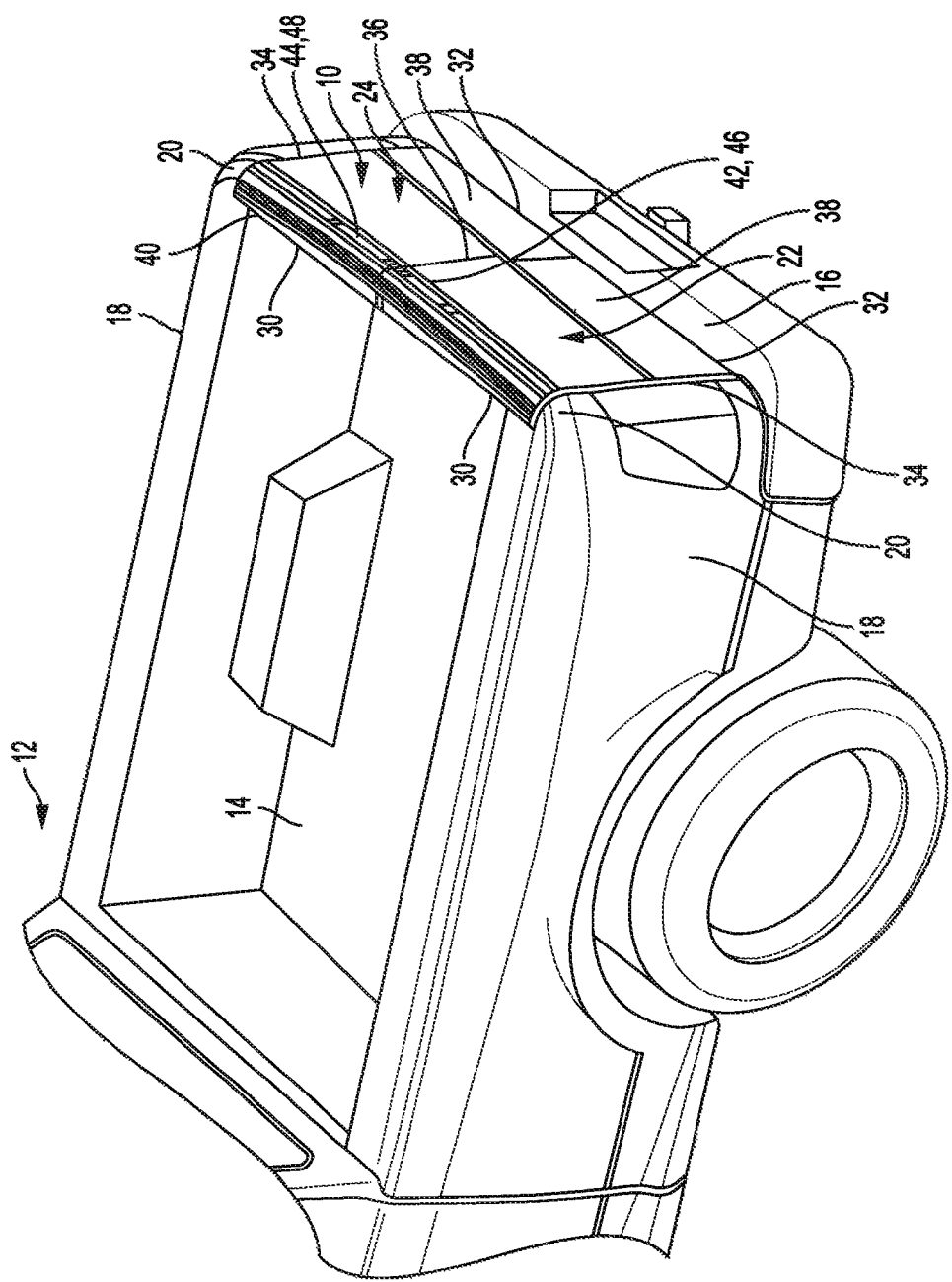
FIG. 1 is a perspective view of a vehicle having an example multifunctional tailgate system, in accordance with the principles of the present application.

Referring to FIG. 1, an example multifunctional tailgate for a vehicle 12 is generally shown and indicated at reference numeral 10. In the illustrated example, vehicle 12 is a pickup truck and multifunctional tailgate 10 is coupled thereto to allow selective enclosure of and access to a cargo bed 14. However, it will be appreciated that tailgate 10 may be utilized in various other vehicle configurations where a door or closure member is used to provide selective access to an area of the vehicle 12.

In the illustrated, multifunctional tailgate 10 is disposed at a rearward end 16 of sidewalls 18 between D-pillars 20 like a conventional tailgate. However, tailgate 10 includes first and second doors 22, 24 in a 50/50 split configuration. It will be appreciated that various other split configurations are envisioned such as, for example, a 60/40 split. Each door 22, 24 includes an upper end 30, an opposite lower end 32, an outer end 34, and an opposite inner end 36. In the split configuration, inner ends 36 are contiguous when tailgate 10 is in a closed configuration, as shown in FIG. 1. Doors 22, 24 further include an outer side 38 and an opposite inner side 40 configured to face a cab of the pickup truck 12 when the doors 22, 24 are in the closed configuration.

In the example embodiment, doors 22, 24 include respective handles 42, 44 configured to provide for independent operation of each door 22, 24. Touchpads 46, 48 facilitate opening doors 22, 24 in various different operational configurations. In one example, the touchpads 46, 48 are electronic touchpads functioning in the form of an electronic switch, or other mechanical or electro-mechanical actuation device to actuate electro-mechanical latches (not shown) of the doors 22, 24.

In one example configuration, multifunction tailgate 10 can be constructed and configured to operate like that described in co-owned U.S. Pat. No. 8,740,279, the contents of which are incorporated herein in their entirety by reference thereto. As such, each door 22, 24 can be independently opened to swing out about a vertical axis 50 or lower down about a horizontal axis 52. In addition, a center pin 54 is configured to selectively couple doors 22, 24 together. For example, in the illustrated example, pin 54 is associated with door 24 and selectively engages door 22 to couple doors 22, 24 together. As such, doors 22, 24 are configured to open together or in unison about axes 50, 52.

Figure 3:
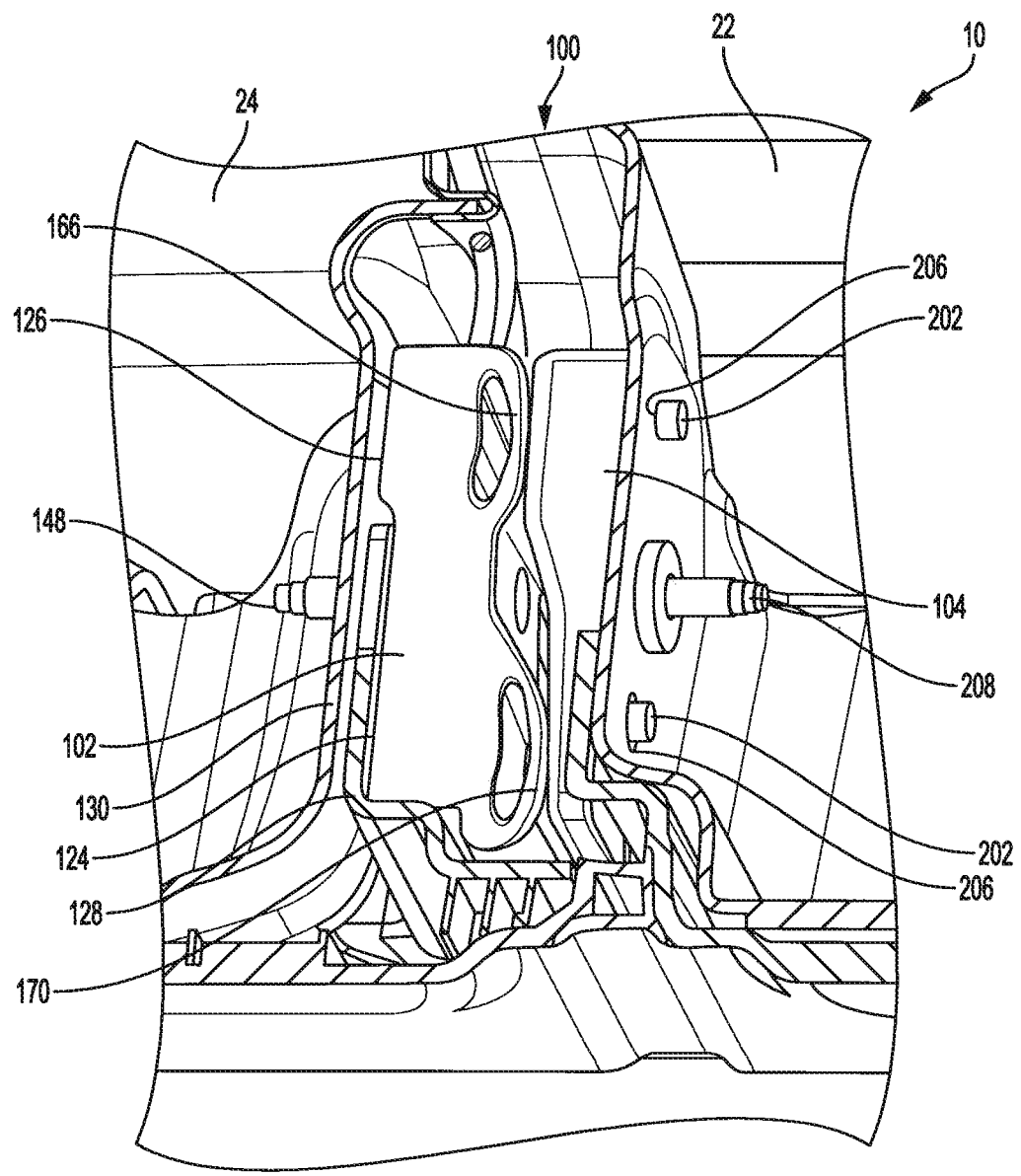
FIG. 3 is a sectional view of the multifunctional tailgate system having an example dual platform bumper system in accordance with the principles of the present application.

With further reference to FIGS. 3-5, multifunction tailgate 10 includes a dual platform bumper system 100 operatively associated therewith. Dual platform bumper system 100 is configured to provide a plurality of spaced apart contact points for doors 22, 24 when they are in the closed position (see FIGS. 1 and 3) to facilitate preventing door over-travel and other relative motion therebetween. In the example embodiment, dual platform bumper system 100 generally includes a bumper 102 and associated platform 104, as described herein in more detail.

Figure 4A:
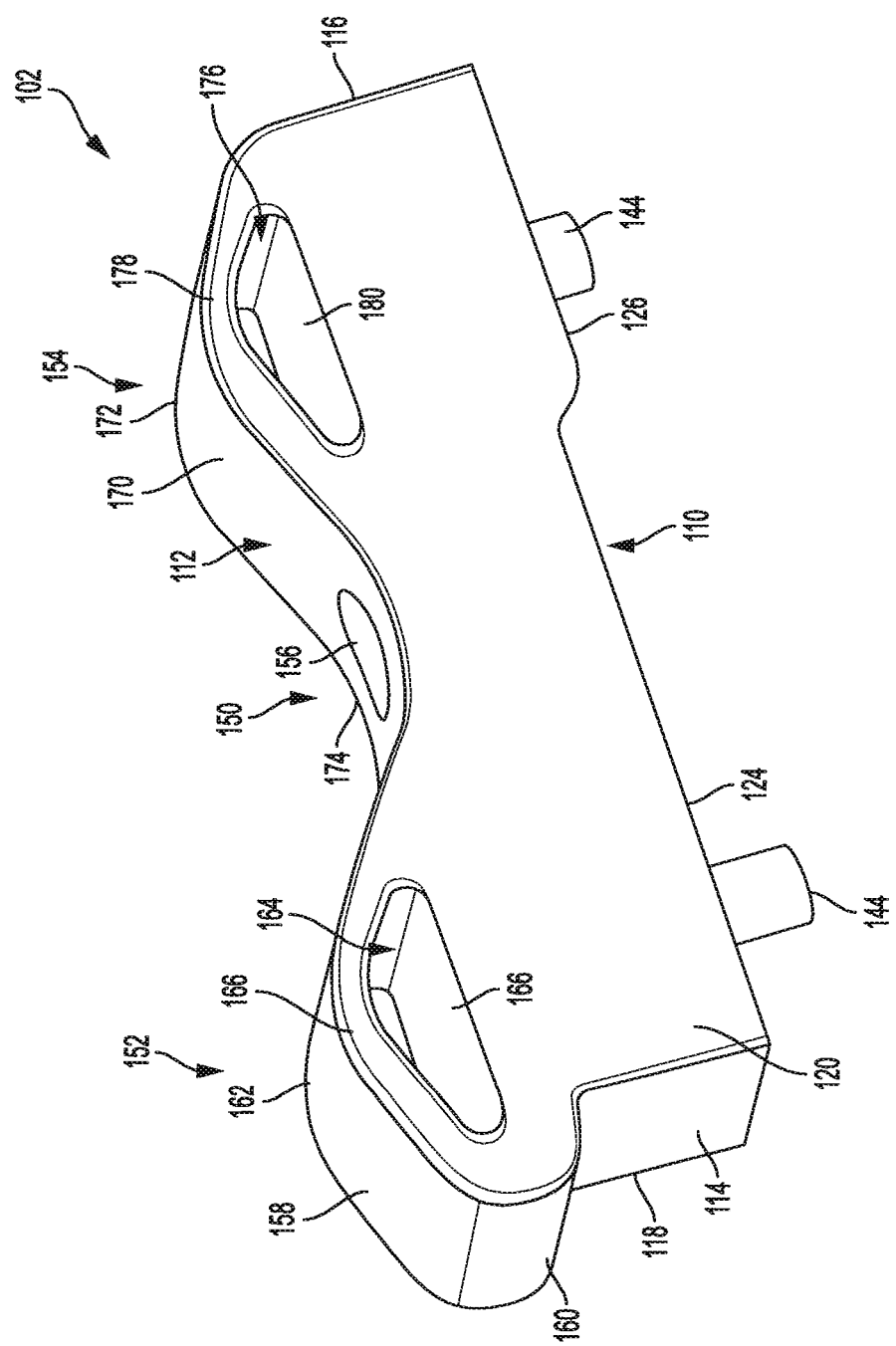
FIG. 4A is a top perspective view of a bumper of the bumper system shown in FIG. 3, in accordance with the principles of the present application.
Figure 4C:
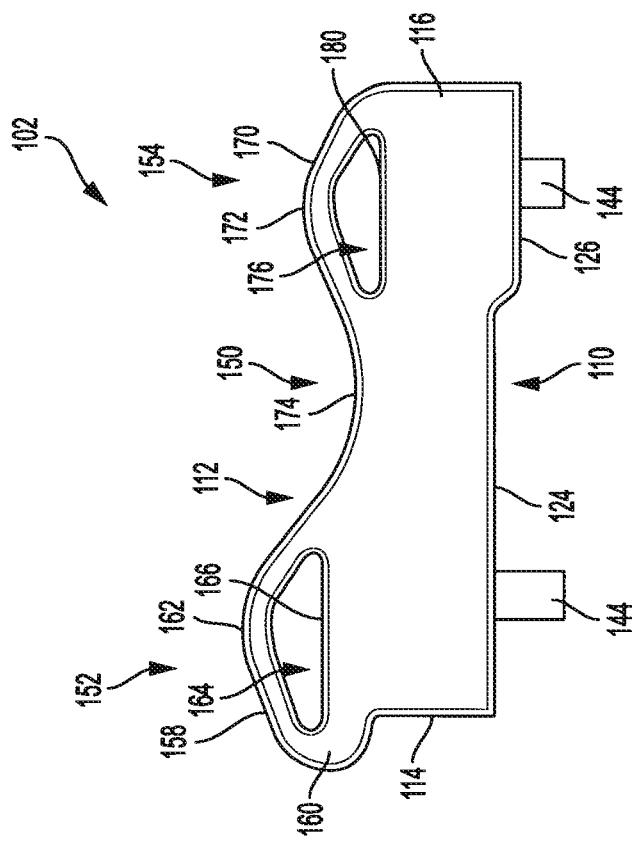
FIG. 4C is a side view of the bumper shown in FIG. 4A, in accordance with the principles of the present application.
Figure 4B:
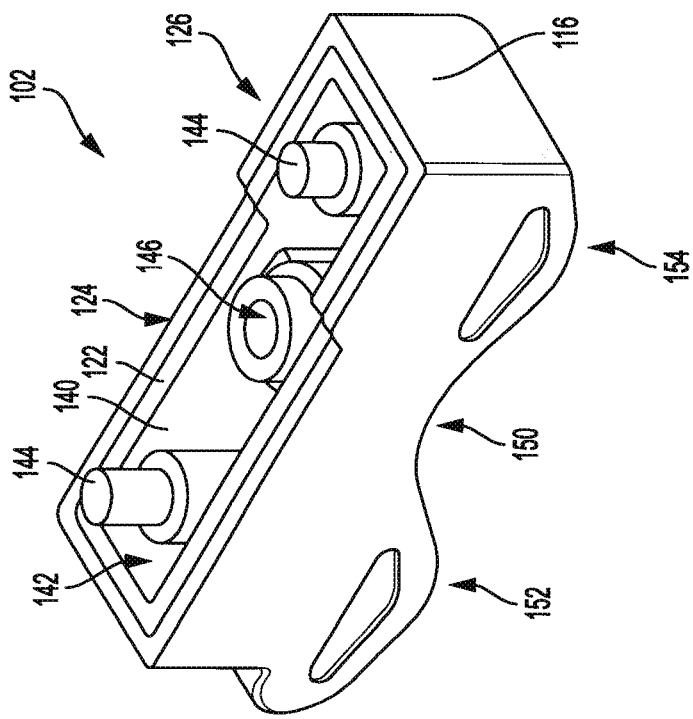
FIG. 4B is a bottom perspective view of the bumper shown in FIG. 4A, in accordance with the principles of the present application.

As shown in FIGS. 4A-4C, bumper 102 generally includes an inner surface 110, an outer surface 112, a rearward surface 114, a forward surface 116, and upper and lower side surfaces 118 and 120. In the example embodiment, shown in FIG. 4B, inner surface 110 is open and configured to receive an insert 122. As shown in FIG. 4C, inner surface 110 and insert 122 define a first plane or platform 124 offset from a second plane or platform 126. As such, as illustrated in FIG. 3, first platform 124 is configured to be disposed against a first structural portion 128 that defines door inner end surface 36, and second platform 126 is configured to be disposed against a second structural portion 128 that further defines door inner end surface 36. In one example embodiment, platform 124 is parallel to platform 126.

The insert 122 generally includes a perimeter wall 140 defining an interior cavity 142 in which are disposed a pair of locating pins 144 and a fastener aperture 146. The locating pins 144 are configured to be received within corresponding receiving apertures (not shown) formed in the inner end surface 36 of the door 24. A fastener 148 (FIG. 3) is configured to extend through the fastener aperture 146 and the door inner end surface 36 to thereby couple bumper 102 to door 24. However, it will be appreciated that in other arrangements bumper 102 can be configured to couple to door 22.

In the example embodiment, bumper outer surface 112 is generally undulated and defines a valley 150 between an upper peak 152 and a relatively lower peak 154. The valley 150 includes a fastener aperture 156 formed therein to align with insert fastener aperture 146 and receive the fastener 148. The upper peak 152 includes a generally curved outer surface 158 that defines an outer lip 160 and an apex 162. As shown in FIG. 4C, the outer lip 160 extends outwardly past a plane defined by the bumper rearward surface 114. The apex 162 defines the outermost point of the curved outer surface 158 and defines a first or initial point of contact between the upper peak 152 and platform 104.

As further illustrated, in the example embodiment, the upper peak 152 includes a relief aperture 164 formed therein. As shown, the relief aperture 164 at least partially defines a deflectable rib 166, which forms at least a portion of the curved outer surface 158. As described herein in more detail, when platform 104 engages upper peak 152, relief aperture 164 enables an elastic collapsing or inward motion of the rib 166 toward an inner surface 168 of the relief aperture 164. Such collapsing enables energy absorption (e.g., damping) and facilitates preventing outward forces through the door panels to the hinges (not shown).

In the example embodiment, the lower peak 154 includes a generally curved outer surface 170 that defines an apex 172. The apex 172 defines the outermost point of the curved outer surface 170 and defines a first or initial point of contact between the lower peak 154 and platform 104. As shown in FIG. 3C, relative to a lowermost point 174 of the valley 150, the apex 172 is lower than the upper peak apex 162.

In the illustrated embodiment, the lower peak 154 includes a relief aperture 176 formed therein. As shown, the relief aperture 176 at least partially defines a deflectable rib 178, which forms at least a portion of the curved outer surface 170. As described herein in more detail, when platform 104 engages lower peak 154, relief aperture 176 enables an elastic collapsing or inward motion of the rib 178 toward an inner surface 180 of the relief aperture 176. Such collapsing also enables energy absorption and facilitates preventing outward forces through the door panels to the hinges.

Moreover, the height positioning of the upper peak apex 162 and the lower peak apex 172 enables control of the timing of the engagement between the bumper 102 and the platform 104 during closing of doors 22, 24. For example, during closing of doors 22, 24, increasing the height of either apex 162, 172 (relative to lowermost point 174) provides a quicker contact between that apex 162, 172 and the platform 104. In contrast, decreasing the height of either apex 162, 172 reduces the time to contact between that apex 162, 172 and the platform 104. Such control of engagement time enables control of the timing of engagement between bumper 102 and platform 104.

Figure 5B:
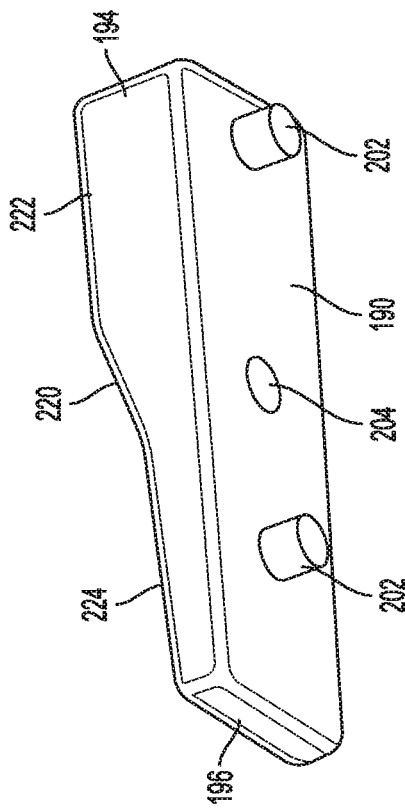
FIG. 5B is a bottom perspective view of the platform shown in FIG. 5A, in accordance with the principles of the present application.
Figure 5C:
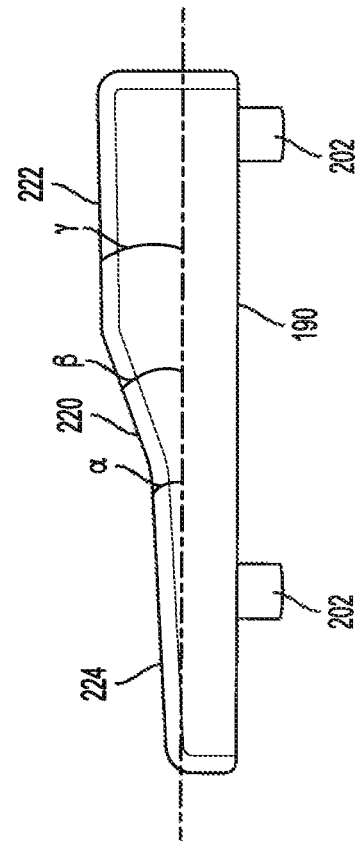
FIG. 5C is a side view of the platform shown in FIG. 5A, in accordance with the principles of the present application.
Figure 5A:
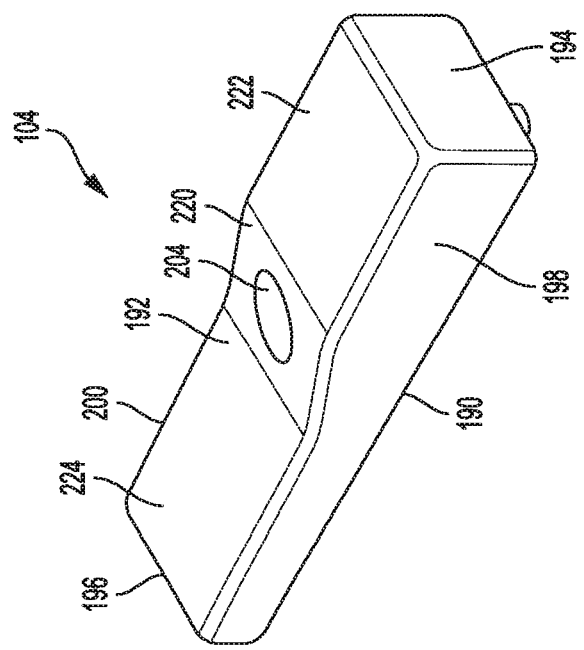
FIG. 5A is a top perspective view of a platform of the bumper system shown in FIG. 3, in accordance with the principles of the present application.

As shown in FIGS. 5A-5C, platform 104 generally includes an inner surface 190, an outer surface 192, a rearward surface 194, a forward surface 196, and upper and lower side surfaces 198 and 200. Inner surface 190 includes a pair of locating pins 202 and a fastener aperture 204. The locating pins 202 are configured to be received within corresponding receiving apertures 206 (FIG. 3) formed in the inner end surface 36 of door 22. A fastener 208 (FIG. 3) is configured to extend through fastener aperture 204 and the door inner end surface 36 to thereby couple platform 104 to door 22. However, it will be appreciated that in other arrangements platform 104 can be configured to couple to door 24.

In the example embodiment, platform outer surface 192 is generally stepped and defines a transitional surface 220 disposed between an upper contact platform 222 and a relatively lower contact platform 224. As shown in FIG. 5B, lower contact platform 224 is disposed at an angle 'α' relative to horizontal plane 226 (e.g., the planar surface defined by inner surface 190), transitional surface 220 is disposed at an angle 'β' relative to the horizontal plane 226, and upper contact platform 222 is disposed at an angle 'γ' relative to the horizontal plane 226. In some examples, angles 'α' and 'γ' are chosen based on door swing, and angle 'α' is equal to or substantially equal to angle 'γ'.

In the example embodiment, platform 104 is coupled to the door 22 in an orientation where upper contact platform 222 is disposed toward the door outer side 38 (i.e., toward a rear of the vehicle 12 when the door 22 is closed), and the lower contact platform 224 is disposed toward the door inner side 40 (i.e., toward a front of the vehicle 12 when door 22 is closed). Platform 104 is oriented on door 22 such that platform 104 is configured to engage bumper 102 when doors 22, 24 are in the closed position shown in FIG. 3.

Figure 2:
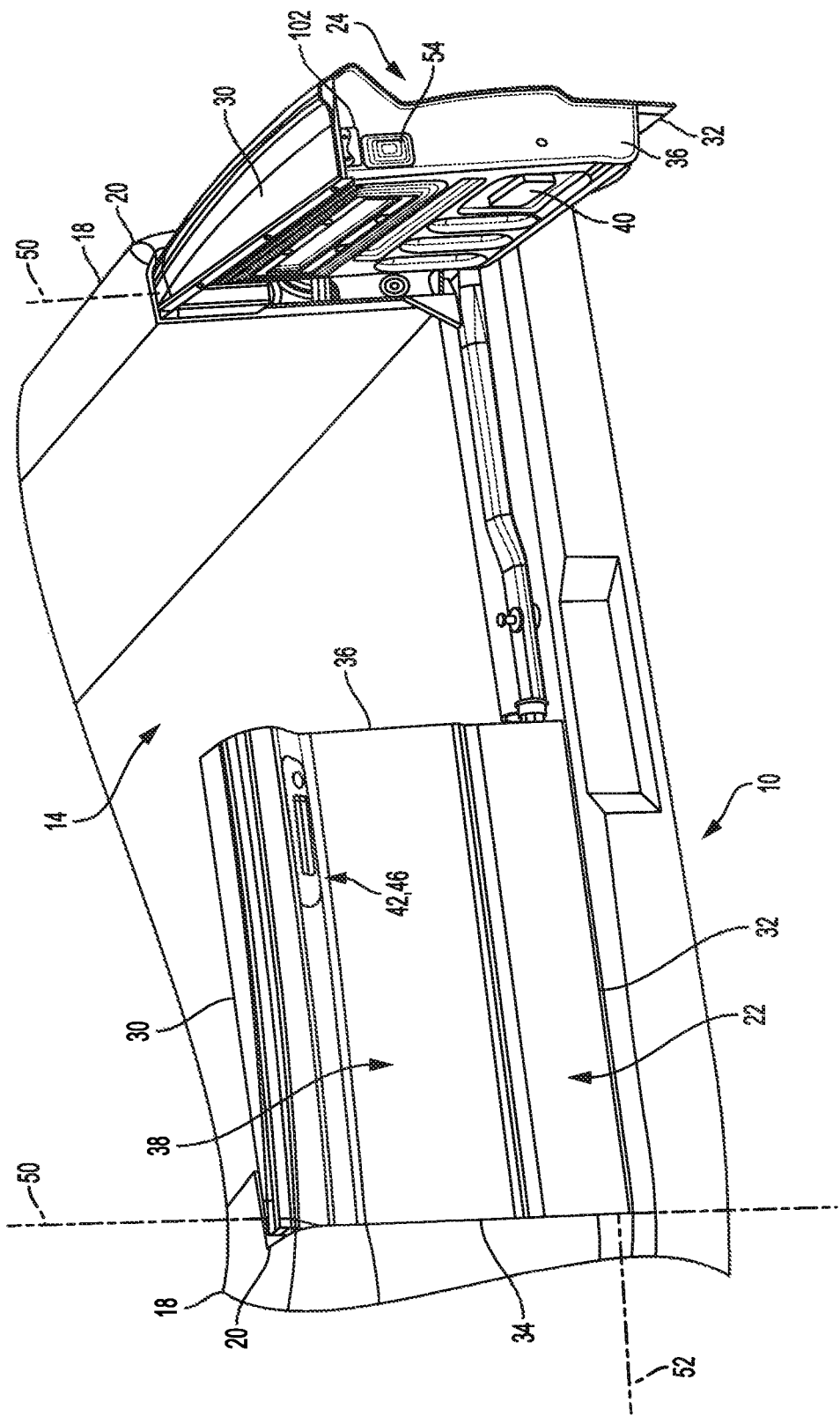
FIG. 2 is a perspective view of the multifunctional tailgate system shown in FIG. 1 in a partially open position, in accordance with the principles of the present application.

In one example operation of dual platform bumper system 100, door 24 is moved to the closed position (e.g., as shown in FIG. 1) and door 22 is in an open position (e.g., similar to door 24 shown in FIG. 2). As door 22 moves to the closed position (shown in FIGS. 1 and 3), lower contact platform 224 passes bumper lower peak 154 without contact. As such, the heights of each of lower contact platform 224 and bumper lower peak 154 provide clearance between each other during door closing and opening.

As platform 104 moves further toward the closed position, lower contact platform 224 initially comes into contact with upper peak apex 162, and upper contact platform 222 comes into contact with lower peak apex 172. In some embodiments, bumper 102 and platform 104 are designed for simultaneous contact at both apexes 162, 172. Such contact causes sliding friction and begins to slow movement of the door 22. Moreover, the materials of each of bumper 102 and platform 104 are chosen to provide a desired sliding friction therebetween without undesirable noise.

Further closing movement of door 22 and platform 104 causes lower contact platform 224 and upper contact platform 222 to engage and deflect respective curved outer surfaces 158 and 170. For example, due to the ramped orientation at angle 'α', the lower contact platform 224 increases engagement with and deflection of the curved outer surface 158 the further platform 104 moves toward a front of the vehicle 12. In a similar fashion, due to the ramped orientation at angle 'γ', the upper contact platform 222 increases engagement with and deflection of the curved outer surface 170 the further platform 104 moves toward a front of the vehicle 12.

Due to relief apertures 164 and 176, deflectable ribs 166 and 178 elastically deform radially inward to absorb and slow movement of door 22 until it is stopped. In this closed position shown in FIG. 3, the collapsed ribs 166, 178 are elastically loaded to return to the position shown in FIG. 4A, thereby maintaining frictional contact between the bumper 102 and platform 104 at two points (e.g., on two planes). As such, the bumper system facilitates preventing back and forth oscillation and over-travel between the doors 22, 24 at an unsecured location (i.e., the upper free edges of the doors).

Described herein are systems and methods for controlling relative motion between two doors of a split tailgate system. A bumper system provides a dual plane platform that selectively engages a dual plane bumper when the doors are in a closed position. The bumper is fabricated from an elastically deformable material that deflects when coming into contact with the platform to provide increased frictional contact therebetween and prevent over-travel of and relative movement between the split tailgate doors.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A dual platform bumper system for a vehicle having at least one door, the system comprising:
   a bumper configured to couple to one of the at least one door and another vehicle component, the bumper having first and second points of contact; and
   a platform configured to couple to the other of the at least one door and the another vehicle component, the platform having an upper contact platform and a lower contact platform,
   wherein the upper contact platform is configured to contact the first point of contact when the at least one door is moved to a closed position, and
   wherein the lower contact platform is configured to contact the second point of contact when the at least one door is moved to the closed position to facilitate preventing over-travel relative movement of the at least one door;
   wherein the vehicle includes a split door tailgate system with the at least one door comprising a first tailgate door of the split door tailgate system and the another vehicle component comprising a second tailgate door of the split door tailgate system; and
   wherein the bumper is configured to couple to the first tailgate door and the platform is configured to couple to the second tailgate door.

2. The system of claim 1, wherein the upper contact platform extends along a first plane, and the lower contact platform extends along a second plane that is different than the first plane.

3. The system of claim 2, wherein the first plane is oriented at a non-parallel angle relative to a horizontal plane, the upper contact platform being ramped to increase contact with the bumper the further the at least one door moves toward the closed position.

4. The system of claim 3, wherein the second plane is oriented at a non-parallel angle relative to the horizontal plane, the lower contact platform being ramped to increase contact with the bumper the further the at least one door moves toward the closed position.

5. The system of claim 1, wherein the bumper includes an inner surface and an opposite outer surface, the inner surface configured to couple to the one of the at least one door and the another vehicle component.

6. The system of claim 5, wherein the outer surface includes a valley disposed between an upper peak and a lower peak, wherein the lower peak includes a curved outer surface having an apex that is the first point of contact, and wherein the upper peak includes a curved outer surface having an apex that is the second point of contact.

7. The system of claim 6, wherein the upper peak further includes a relief aperture that defines a deflectable rib configured to selectively elastically deform into the relief aperture when contacted by the lower contact platform.

8. The system of claim 7, wherein the lower peak further includes a relief aperture that defines a deflectable rib configured to selectively elastically deform into the relief aperture when contacted by the upper contact platform.

9. A vehicle comprising:
   a frame;
   a split door tailgate system having a first tailgate door and a second tailgate door, the first tailgate door pivotably coupled to the frame about a first vertical axis, and the second tailgate door pivotally coupled to the frame about a second vertical axis; and
   a dual platform bumper system comprising:
      a bumper coupled to the first tailgate door and having first and second points of contact; and
      a platform coupled to the second tailgate door and configured to engage the bumper when the first and second tailgate doors are in a closed position,
      wherein the platform includes an upper contact platform configured to contact the first point of contact when the first tailgate door is closed and the second tailgate door is moved to the closed position, and
      wherein the platform includes a lower contact platform configured to contact the second point of contact when the first tailgate door is closed and the second tailgate door is moved to the closed position to facilitate preventing over-travel relative movement of at least the second tailgate door.

10. The vehicle of claim 9, wherein the upper contact platform extends along a first plane, and the lower contact platform extends along a second plane that is different than the first plane.

11. The vehicle of claim 10, wherein the first plane is oriented at a non-parallel angle relative to a horizontal plane, the upper contact platform being ramped to increase contact with the bumper the further the second tailgate door moves toward the closed position.

12. The vehicle of claim 11, wherein the second plane is oriented at a non-parallel angle relative to the horizontal plane, the lower contact platform being ramped to increase contact with the bumper the further the second tailgate door moves toward the closed position.

13. The vehicle of claim 9, wherein the bumper includes an inner surface and an opposite outer surface, the inner surface coupled to the first tailgate door.

14. The vehicle of claim 13, wherein the outer surface includes a valley disposed between an upper peak and a lower peak, wherein the lower peak includes a curved outer surface having an apex that is the first point of contact, and wherein the upper peak includes a curved outer surface having an apex that is the second point of contact.

15. The vehicle of claim 14, wherein the upper peak further includes a relief aperture that defines a deflectable rib configured to selectively elastically deform when contacted by the lower contact platform.

16. The vehicle of claim 15, wherein the lower peak further includes a relief aperture that defines a deflectable rib configured to selectively elastically deform when contacted by the upper contact platform.

* * * * *